United States Patent
Schuerg et al.

(10) Patent No.: US 6,832,749 B2
(45) Date of Patent: Dec. 21, 2004

(54) VALVE FOR CONTROLLING FLUIDS

(75) Inventors: Stefan Schuerg, Ludwigsburg (DE); Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 167 days.

(21) Appl. No.: 10/049,285

(22) PCT Filed: May 30, 2001

(86) PCT No.: PCT/DE01/02039

§ 371 (c)(1), (2), (4) Date: Apr. 17, 2002

(87) PCT Pub. No.: WO01/94821

PCT Pub. Date: Dec. 13, 2001

(65) Prior Publication Data

US 2002/0134953 A1 Sep. 26, 2002

(30) Foreign Application Priority Data

Jun. 9, 2000 (DE) .......................................... 100 28 768

(51) Int. Cl.⁷ ............................................. F16K 31/02
(52) U.S. Cl. .................................... 251/129.06; 251/57
(58) Field of Search ............................ 251/57, 129.06, 251/129.17; 239/88, 96, 102.2

(56) References Cited

U.S. PATENT DOCUMENTS

| | | | | |
|---|---|---|---|---|
| 3,651,657 A | * | 3/1972 | Bottum | 62/196.3 |
| 4,378,774 A | * | 4/1983 | Kato | 123/446 |
| 4,858,439 A | * | 8/1989 | Sawada et al. | 60/583 |

FOREIGN PATENT DOCUMENTS

| | | |
|---|---|---|
| DE | 198 03 842 A | 11/1998 |
| DE | 197 44 235 A1 | 4/1999 |
| DE | 197 44 235 A | 4/1999 |

* cited by examiner

Primary Examiner—Edward K. Look
Assistant Examiner—John K. Fristoe, Jr.
(74) Attorney, Agent, or Firm—Ronald E. Greigg

(57) ABSTRACT

The present invention relates to a valve for controlling fluids, which has a piezoelectric actuator that is disposed in an actuator bore. A hydraulic booster and a bellows are also provided. The bellows is embodied such that it can absorb the axial stroke of the piezoelectric actuator. The bellows is connected solidly to the piezoelectric actuator and is also connected solidly to the actuator bore assure a fluid-tight seal of the actuator module relative to the other regions of the valve.

9 Claims, 2 Drawing Sheets

VALVE FOR CONTROLLING FLUIDS

CROSS-REFERENCE TO RELATED APPLICATIONS

This is a 35 U.S.C. 371 application of PCT/DE 01/02039, filed on May 30, 2001.

BACKGROUND OF THE INVENTION

1. Field Of The Invention

The present invention relates to a valve for controlling fluids and more particularly to such a valve including a piezoelectric actuator disposed in an actuator bore.

2. Brief Description Of The Prior Art

FIG. 2 shows a valve for controlling fluids in accordance with the prior art. The valve 1 includes a housing 4, in which there is an actuator bore 3 for receiving a piezoelectric actuator 2. The piezoelectric actuator 2 is connected to a hydraulic booster 11 via an actuating piston 15. The hydraulic booster 11 comprises a first piston 12, a second piston 13, and a fluid-filled pressure chamber 14 disposed between the two pistons. For sealing the actuator module off from the hydraulic booster, an O-ring 17 and a metal bellows 5 are provided. The O-ring 17 is disposed in an annular recess in a disk 18 and seals off the actuator module at the actuator bore 3. The metal bellows 5 is connected on one end to the actuating piston 15 and by its other end communicates with an inner bore in the disk 18. As a result, the metal bellows 5 seals off the actuator module in the region of the actuating piston.

In the valve 1 known from the prior art, it is disadvantageous, however, that the O-ring 17 can become damaged at the insertion edge as the valve is being assembled. Also, the O-ring 17 does not seal off the actuator module one hundred percent. Moreover, the tightness furnished by the O-ring cannot be checked. In addition, via the insertion path of the O-ring into the actuator bore, it can happen that the O-ring will twist or turn, which can cause eventual leaks. Because of the relatively limited installation space, the actuator spring can be embodied with only a few windings. The consequence can be that the spring becomes skewed relative to a center axis of the valve, so that the introduction of force to the actuator takes place eccentrically. This can cause rapid wear of the valve.

SUMMARY OF THE INVENTION

The valve for controlling fluids according to the invention has the advantage over the prior art that it no longer requires an O-ring for sealing purposes. Sealing off the actuator module from the hydraulic booster is achieved such that a bellows is solidly connected to the actuator and to the actuator bore. As a result of this feature of the invention, both the O-ring and the disk in which the groove for the O-ring is provided can be dispensed with. This reduces the number of component parts, and the valve of the invention can be produced more simply and economically. With the elimination of the disk, still more installation space is gained, or in other words the valve of the invention can be constructed more compactly. Especially If the valve is used as an injection valve for an engine, this is a major advantage, since the space available in the engine compartment is limited, and hence the valve can be installed in different engines from the most various manufacturers without requiring modifications.

To enable simple assembly and to furnish the most variable possible installation of the bellows in the valve, the bellows preferably has a sleevelike extension that can be solidly connected to the actuator bore. Thus depending on the length of the sleevelike extension, the bellows can be guided directly along the inside of the actuator bore and secured to the actuator bore at an arbitrary point.

To furnish a simple, economical production of the valve of the invention, the connection between the bellows and the piezoelectric actuator and/or the connection between the bellows and the actuator bore is embodied as a welded connection. Especially advantageously, the connection is embodied here as an annular welded connection. This also makes it possible, after the welding operation, to check the tightness between the bellows and the actuator on the one hand and between the bellows and the actuator bore on the other. A long service life of the valve of the invention is thus assured.

In a further advantageous feature of the present invention, the sleevelike extension of the bellows is solidly connected to the actuator bore via a press fit of a retaining body. As a result, the sleevelike extension is disposed between the wall of the actuator bore and the retaining body. The retaining body can also be provided so as to receive the hydraulic booster of the valve at least in part. Because of the annular press fit of the retaining body, a partial deformation of the sleevelike extension of the bellows thus ensues, causing it to rest sealingly from its top to its underside on the actuator bore. At the same time, the retaining body is positioned in the valve thereby. As a result, the welding point between the sleevelike extension of the bellows and the actuator bore can be omitted.

In order to absorb a sufficient axial stroke of the actuator, the bellows preferably has three undulations. However, the number of undulations can be greater or fewer, depending on the required length of the axial stroke.

In order to have an adequate service life, the bellows is preferably produced from metal.

To prevent skewing of the restoring spring for the actuator and an eccentric introduction of force by the spring, the restoring spring preferably has at least four windings. The windings are advantageously designed such that they rest on the actuator bore, but without generating a large amount of friction.

BRIEF DESCRIPTION OF THE DRAWINGS

One exemplary embodiment of the present invention is described in detail herein below, in conjunction with the drawings, in which.

DESCRIPTION OF THE PREFERRED EMBODIMENTS

Figure 1:
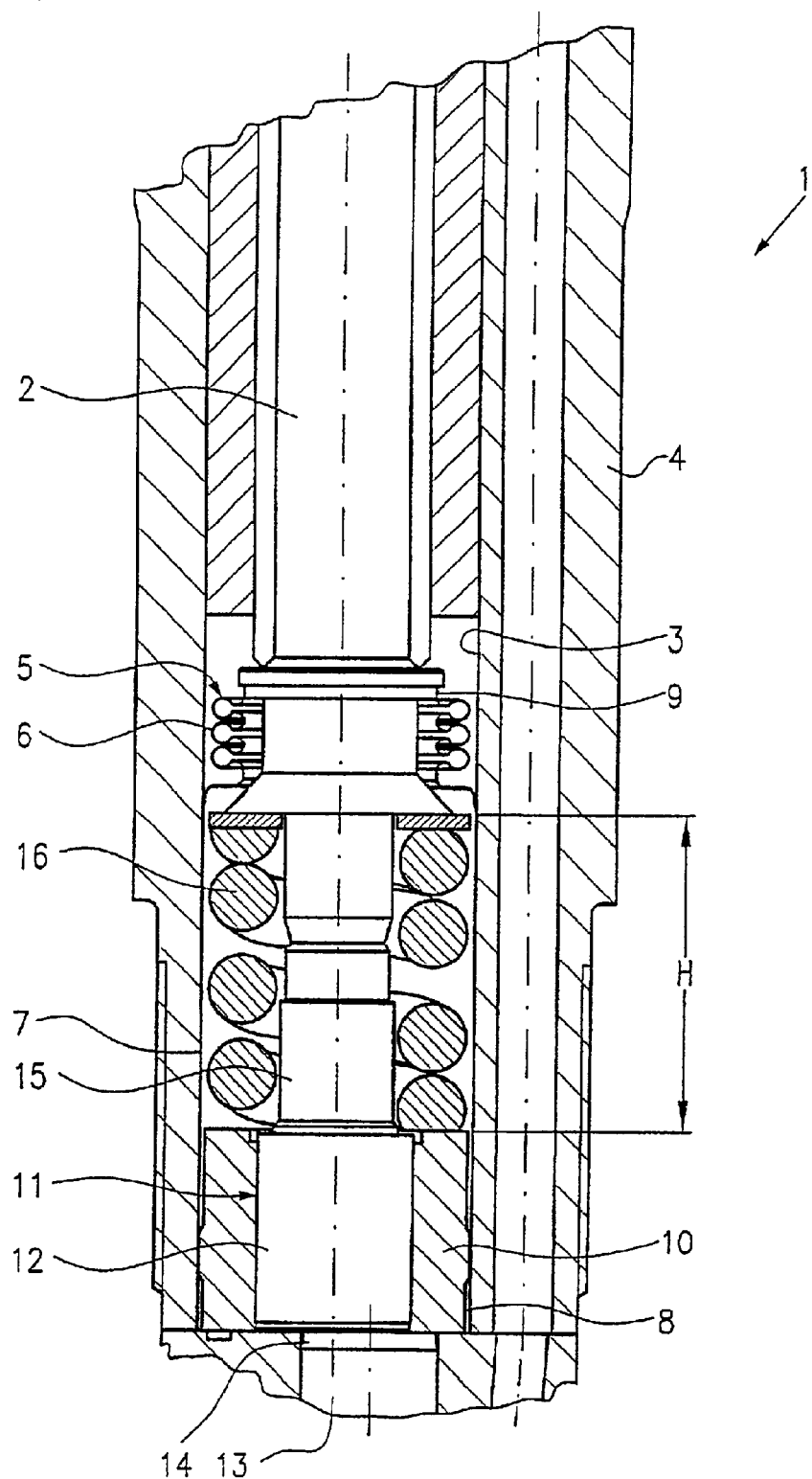
FIG. 1 is a longitudinal sectional view of a valve for controlling fluids in accordance with one exemplary embodiment of the present invention.

In FIG. 1, an exemplary embodiment of a valve for controlling fluids in accordance with the present invention is shown. For instance, the valve shown can be used as a fuel injection valve, or as a control valve for a fuel injection valve.

The valve 1 includes a piezoelectric actuator 2, which is disposed in an actuator bore 3 provided in a housing 4 of the valve. Via an integrally embodied, stepped actuating piston 15, the piezoelectric actuator 2 is connected to a hydraulic booster 11. The hydraulic booster 11 includes a first piston 12, a second piston 13 that is disposed offset from the first piston 12, and a pressure chamber 14 located between the two pistons.

As shown in FIG. 1, a restoring spring 16 for restoring the piezoelectric actuator 2 is disposed around the actuating piston 15.

For sealing off the actuator module from the module of the hydraulic booster, a metal bellows 5 is provided, which has three undulations 6 as well as a sleevelike part 7. The end of the part of the metal bellows 5 that is provided with the undulations 6 is welded to the head of the actuator 2; sealing is thus assured by the annular welded connection 9.

As also shown in FIG. 1, the end of the sleevelike part 7 of the metal bellows 5 is connected in fluid-tight fashion to the interior of the actuator bore 3 by an annular welded connection 8. Thus by means of the two welded connections 8 and 9, the metal bellows 5 provides fluid-tight sealing between the actuator module and the module comprising the hydraulic booster. For receiving the first piston 12 of the hydraulic booster 11, a retaining body 10 is secured inside the sleevelike part 7, in the lower region of the sleevelike part 7.

If the piezoelectric actuator 2 is now actuated, it moves in the axial direction of the valve 1 and via the actuating piston 15 presses against the first piston 12 of the hydraulic booster counter to the spring force of the spring 16. In the process, the undulations 6 of the metal bellows 5 absorb the axial stroke of the piezoelectric actuator 2. After the completion of the stroke, the piezoelectric actuator 2 is restored to its outset position by the spring 16, and the metal bellows 5 likewise assumes its original position again.

Figure 2:
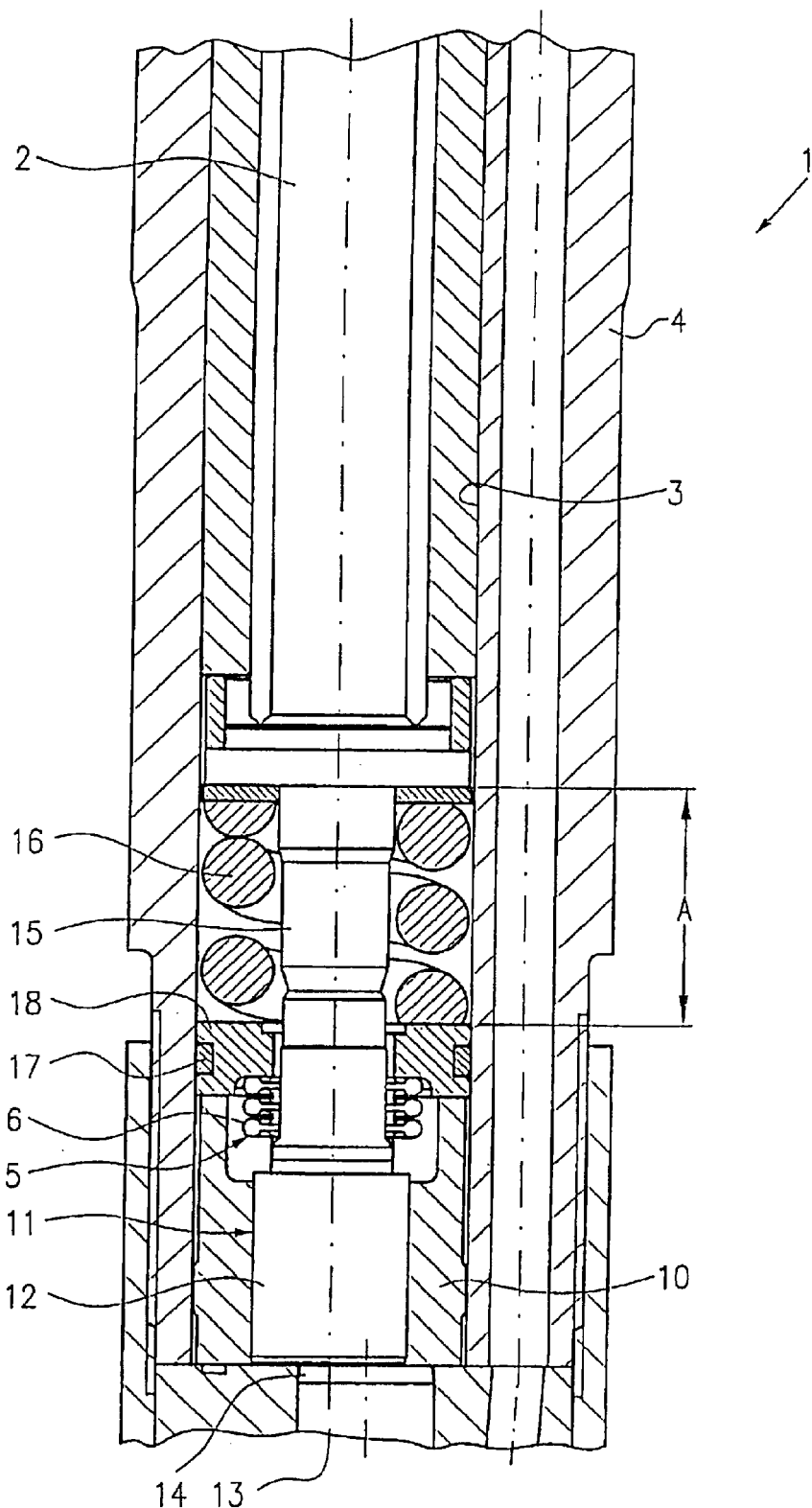
FIG. 2 is a view similar to FIG. 1 showing a valve for controlling fluids in accordance with the prior art.

As a comparison between the valve of the invention in FIG. 1 and the valve of the prior art in FIG. 2 shows, the valve of the invention has an installation space of height H for the spring 16; conversely, for the spring 16 the valve of the prior art has a markedly smaller installation space of height A, which is markedly less than the height H. As a result, in the invention it is possible for the spring 16 to have one additional winding, which markedly lessens the risk that the spring 16 will become skewed and that an eccentric introduction of force will occur. Since as a result of the connection of the metal bellows 5 to the piezoelectric actuator 2 and the bore 3 for the actuator the number of parts is also reduced, since the O-ring and the disk of the prior art can be dispensed with, the valve of the invention is markedly simpler in embodiment. As a result, the production costs can also be reduced.

In summary, a valve for controlling fluids which has a piezoelectric actuator that is disposed in an actuator bore 3 has been described thus far. A hydraulic booster 11 and a bellows 5 are also provided. The bellows 5 is embodied such that it can absorb the axial stroke of the piezoelectric actuator 2. Here the bellows 5 is solidly connected to the piezoelectric actuator 2 and is also solidly connected to the actuator bore 3. This assures a fluid-tight sealing of the actuator module from the other regions of the valve.

The above description of the exemplary embodiment of the present invention is intended solely for illustrative purposes and not for the sake of limiting the invention. Within the scope of the invention, various changes and modifications are possible without departing from the scope of the invention or its equivalent.

What is claimed is:

1. A valve for controlling fluids, comprising a piezoelectric actuator (2) which is disposed in an actuator bore (3), a hydraulic booster (11), and a bellows (5) for absorbing an axial stroke of the piezoelectric actuator (2), wherein the bellows (5) is solidly connected to a head of the piezoelectric actuator (2) and to the actuator bore (3) and wherein the connection between the bellows (5) and the piezoelectric actuator (2) and/or the connection between the bellows (5) and the actuator bore (3) is embodied as a welded connection.

2. The valve for controlling fluids of claim 1, wherein the bellows (5) has a sleevelike extension (7), which is solidly connected to the actuator bore (3).

3. The valve for controlling fluids of claim 2, wherein the sleevelike extension (7) of the bellows (5) is solidly connected to the actuator bore (3) via a press fit of a retaining body (10).

4. The valve for controlling fluids of claim 3, wherein the retaining body (10) at least partly receives the hydraulic booster (11).

5. The valve for controlling fluids of claim 2, wherein the bellows (5) is produced from metal.

6. The valve for controlling fluids of claim 2, wherein an actuator spring (16) has at least four windings, which are placed against the actuator bore (3).

7. The valve for controlling fluids of claim 1, wherein the bellows (5) is embodied with three undulations (6).

8. The valve for controlling fluids of claim 1, wherein the bellows (5) is produced from metal.

9. The valve for controlling fluids of claim 1, wherein an actuator spring (16) has at least four windings, which are placed against the actuator bore (3).

* * * * *